United States Patent
Otomo

(10) Patent No.: US 7,212,382 B2
(45) Date of Patent: May 1, 2007

(54) MAGNETIC HEAD INCLUDING METALLIC MATERIAL LAYER BETWEEN WRITE HEAD SECTION AND READ HEAD SECTION

(76) Inventor: Katsuhiko Otomo, c/o Alps Electric Co., Ltd. 1-7 Yukigaya, Otsuka-cho, Ota-ku, Tokyo (JP)

(*) Notice: Subject to any disclaimer, the term of this patent is extended or adjusted under 35 U.S.C. 154(b) by 436 days.

(21) Appl. No.: 10/852,749

(22) Filed: May 24, 2004

(65) Prior Publication Data
US 2004/0246630 A1 Dec. 9, 2004

(30) Foreign Application Priority Data
Jun. 4, 2003 (JP) .................. 2003-158773

(51) Int. Cl.
*G11B 5/39* (2006.01)
(52) U.S. Cl. .................. 360/317; 360/319
(58) Field of Classification Search ............... 360/317, 360/319
See application file for complete search history.

(56) References Cited

U.S. PATENT DOCUMENTS

| | | | |
|---|---|---|---|
| 6,894,871 B2* | 5/2005 | Alfoqaha et al. | 360/126 |
| 6,937,445 B2* | 8/2005 | Yuito et al. | 360/317 |
| 6,963,470 B2* | 11/2005 | Sato | 360/126 |
| 2004/0218306 A1* | 11/2004 | Sato et al. | 360/123 |
| 2004/0246629 A1* | 12/2004 | Sato | 360/317 |
| 2005/0047015 A1* | 3/2005 | Matono et al. | 360/126 |
| 2006/0082929 A1* | 4/2006 | Kiyono et al. | 360/317 |

FOREIGN PATENT DOCUMENTS

| | | |
|---|---|---|
| JP | 07-201021 | 8/1995 |
| JP | 07-307010 | 11/1995 |
| JP | 2001-209909 | 8/2001 |
| JP | 2001-236614 | 8/2001 |
| JP | 2002-216314 | 8/2002 |

OTHER PUBLICATIONS

The Notification of Reasons for Refusal dated Apr. 18, 2006 for corresponding Japanese Patent Application No. 2003-158773.

* cited by examiner

*Primary Examiner*—Jefferson Evans
(74) *Attorney, Agent, or Firm*—Brinks Hofer Gilson & Lione

(57) ABSTRACT

A magnetic head includes a metallic material layer between a lower core layer and an upper shield layer. This metallic material layer extends to the rear of the magnetic head in the height direction to overlap with a first metal layer. The metallic material layer can therefore efficiently dissipate joule heat generated from a write head section to the outside of the magnetic head through the first metal layer. In addition, the metallic material layer can block a fluctuating magnetic field generated from the write head section. Thus, this magnetic head can reduce variations in the magnetic domain structures of upper and lower shield layers to stabilize the read output of a read head section.

12 Claims, 8 Drawing Sheets

MAGNETIC HEAD INCLUDING METALLIC MATERIAL LAYER BETWEEN WRITE HEAD SECTION AND READ HEAD SECTION

BACKGROUND OF THE INVENTION

1. Field of the Invention

The present invention relates to magnetic heads for use in, for example, floating magnetic head devices and, particularly, to a magnetic head having an excellent heat dissipation effect.

2. Description of the Related Art

FIG. 8 is a longitudinal section of a known magnetic head. In FIG. 8, a write head section Hw is an inductive head. This write head section Hw is formed on a read head section Hr that has, for example, a magnetoresistance effect.

This magnetic head is formed on a trailing end surface 1a of a ceramic slider 1 that constitutes a part of a floating magnetic head device. The read head section Hr is disposed on an $Al_2O_3$ film 2 formed on the trailing end surface 1a of the slider 1. This read head section Hr detects a magnetic field from a recording medium, such as a hard disc, using the magnetoresistance effect to read a recording signal.

The read head section Hr includes a lower shield layer 3, a lower gap layer 4, a magnetic field reader M1, an upper gap layer 5, and an upper shield layer 6. The magnetic field reader M1 is a magnetoresistive element exemplified by a giant magnetoresistive (GMR) element (typically, a spin valve film), which has a giant magnetoresistance effect; a tunneling magnetoresistive (TMR) element, which has a tunneling magnetoresistance effect; and an anisotropic magnetoresistive (AMR) element, which has an anisotropic magnetoresistance effect.

The lower and upper gap layers 4 and 5 are composed of an insulating material such as $Al_2O_3$ and $SiO_2$ while the lower and upper shield layers 3 and 6 are composed of a soft magnetic material with high permeability, such as a Ni—Fe alloy (permalloy).

A separating layer 7 of an insulating material such as $Al_2O_3$ and $SiO_2$ is formed on the upper shield layer 6, and the write head section Hw is formed on the separating layer 7.

A lower core layer 10 is formed on the separating layer 7, and a gap-depth-defining layer 11 is formed on the lower core layer 10. The length between the front surface F of the magnetic head facing the recording medium and the front end surface 11a of the gap-depth-defining layer 11 is defined as a gap depth.

A magnetic pole part 12 extends from the front surface F of the magnetic head onto the gap-depth-defining layer 11.

This magnetic pole part 12 includes a lower magnetic pole layer 13, a nonmagnetic gap layer 14 formed on the lower magnetic pole layer 13, and an upper magnetic pole layer 15 formed on the gap layer 14. The upper and lower magnetic pole layers 15 and 13 are composed of a soft magnetic material such as a Ni—Fe alloy.

An insulating layer 17 is formed on the lower core layer 10 on the rear side of the gap-depth-defining layer 11 in the height direction (the Y direction in the drawing). A coil layer 18 that is composed of a conductive material such as Cu and has a spiral pattern is formed on the insulating layer 17. The coil layer 18, which has a double-layer structure, is covered with an inorganic insulating layer 19 and an organic coil-insulating layer 20.

An upper core layer 16 is formed in a pattern by, for example, frame plating and extends over the magnetic pole part 12 and the coil-insulating layer 20. A base end 16a of the upper core layer 16 is connected to a magnetic connecting layer (back gap layer) 21 formed on the lower core layer 10. The upper and lower core layers 16 and 10 are formed by plating with, for example, a Ni—Fe alloy.

A recording current applied to the coil layer 18 induces a recording magnetic field into the lower and upper core layer 10 and 16 to generate a leakage magnetic field between the lower and upper magnetic pole layers 13 and 15, which are separated by the gap layer 14. As a result, a magnetic signal is recorded from the leakage magnetic field to a recording medium such as a hard disc.

In recent years, the size of a magnetic head has been reduced to support recording media with higher recording density. In addition, the read sensitivity of a read head section of a magnetic head has been improved. Accordingly, the read output of the magnetic field reader M1 is largely subject to variations in the magnetic domain structures of the upper and lower shield layer 6 and 3, which are provided above and below the magnetic field reader M1, respectively.

Such variations in the magnetic domain structures of the upper and lower shield layer 6 and 3 are typically caused by heat generated from the coil layer 18 of the write head section Hw and a fluctuating magnetic field generated from the write head section Hw.

Japanese Unexamined Patent Application Publication Nos. 2001-209909 (Page 9 and FIG. 1 of this publication), 2001-236614 (Page 3 and FIG. 1 of this publication), and 2002-216314 (Page 7 and FIG. 7 of this publication) disclose a magnetic head in which metal layers are provided on the rear sides of upper and lower shield layers in the height direction to dissipate heat generated from a coil layer into a ceramic slider.

The magnetic heads in the first and second patent documents, however, are devised only to facilitate the dissipation of heat from the coil layer; they cannot inhibit variations in the magnetic domain structures of the upper and lower shield layers. In addition, these magnetic heads cannot efficiently dissipate heat from the write head sections.

SUMMARY OF THE INVENTION

In light of these problems, an object of the present invention is to provide a magnetic head that can efficiently dissipate heat generated from its write head section and that can efficiently inhibit variations in the magnetic domain structures of its upper and lower shield layers.

A magnetic head of the present invention includes a write head section including a first magnetic layer, a second magnetic layer disposed above the first magnetic layer, and a coil layer for applying a magnetic field onto the first and second magnetic layers; a read head section including an upper shield layer, a lower shield layer, a reader disposed between the upper shield layer and the lower shield layer, and a first metal layer disposed on the rear side of the upper shield layer in a first direction, the first metal layer being separated from the upper shield layer; and a metallic material layer disposed between the write head section and the read head section, overlapping with the first metal layer.

The metallic material layer, which is disposed between the write head section and the read head section, overlaps with the first metal layer. This metallic material layer can therefore transmit joule heat generated from the coil layer and the magnetic layers to the first metal layer to efficiently dissipate the joule heat to the outside of the magnetic head.

In addition, the metallic material layer can block a fluctuating magnetic field generated from the write head section.

Thus, this magnetic head can reduce variations in the magnetic domain structures of the upper and lower shield layers to stabilize the read output of the read head section.

To dissipate the joule heat generated from the coil layer and the magnetic layers to the outside of the magnetic head more efficiently, this magnetic head preferably has the following structures.

The magnetic head preferably further includes a second metal layer disposed on the rear side of the lower shield layer in the first direction, the second metal layer being separated from the lower shield layer, the metallic material layer overlapping with the second metal layer.

Preferably, the first metal layer is connected to the metallic material layer and the second metal layer is connected to the first metal layer.

Preferably, the read head section is disposed on a substrate and the second metal layer is connected to the substrate.

The magnetic head preferably further includes a third metal layer disposed on the rear side of the first magnetic layer in the first direction, the third metal layer being integrated with or separated from the first magnetic layer, the metallic material layer overlapping with the third metal layer.

The third metal layer is preferably connected to the metallic material layer.

The metallic material layer is preferably connected to the first magnetic layer.

The metallic material layer is preferably composed of a nonmagnetic material to block a fluctuating magnetic field generated from the write head section more effectively.

In particular, the thickness of the metallic material layer is preferably 1,000 to 10,000 Å.

The front end surface of the metallic material layer is preferably positioned on the rear side of the front surface of the magnetic head facing a recording medium in the first direction because a smaller amount of frictional heat generated when the magnetic head slides over the recording medium propagates into the magnetic head.

The length of the metallic material layer in the first direction is preferably larger than the length of the first magnetic layer in the first direction to transmit joule heat generated from the coil layer and block a fluctuating magnetic field generated from the write head section more efficiently. The width of the metallic material layer in the second direction orthogonal to the first direction is preferably larger than the width of the first magnetic layer in the second direction to transmit joule heat generated from the coil layer and block a fluctuating magnetic field generated from the write head section more efficiently.

DESCRIPTION OF THE PREFERRED EMBODIMENTS

Figure 1:
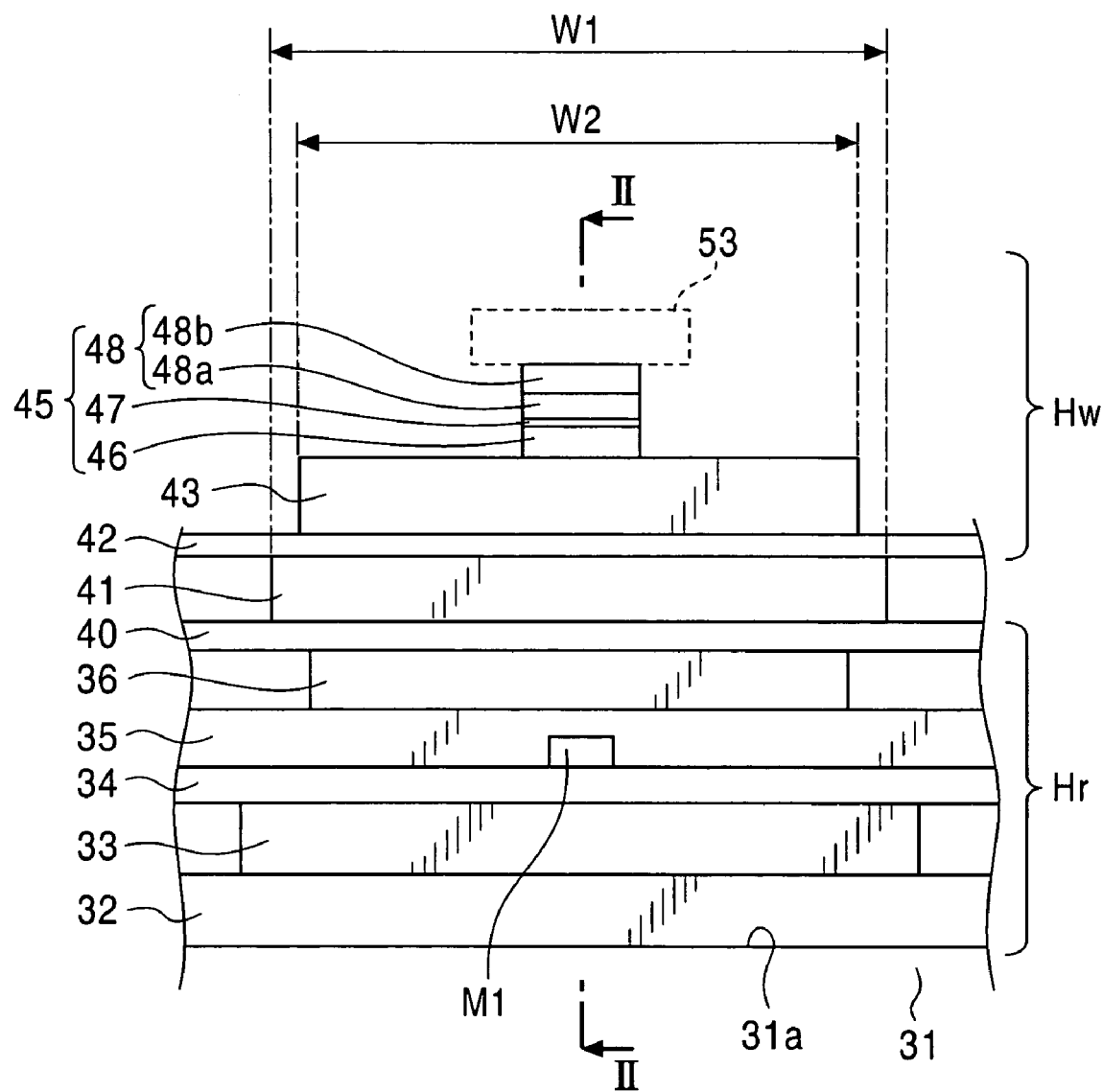
FIG. 1 is a front view (from a recording medium) of a magnetic head according to a first embodiment of the present invention.
Figure 2:
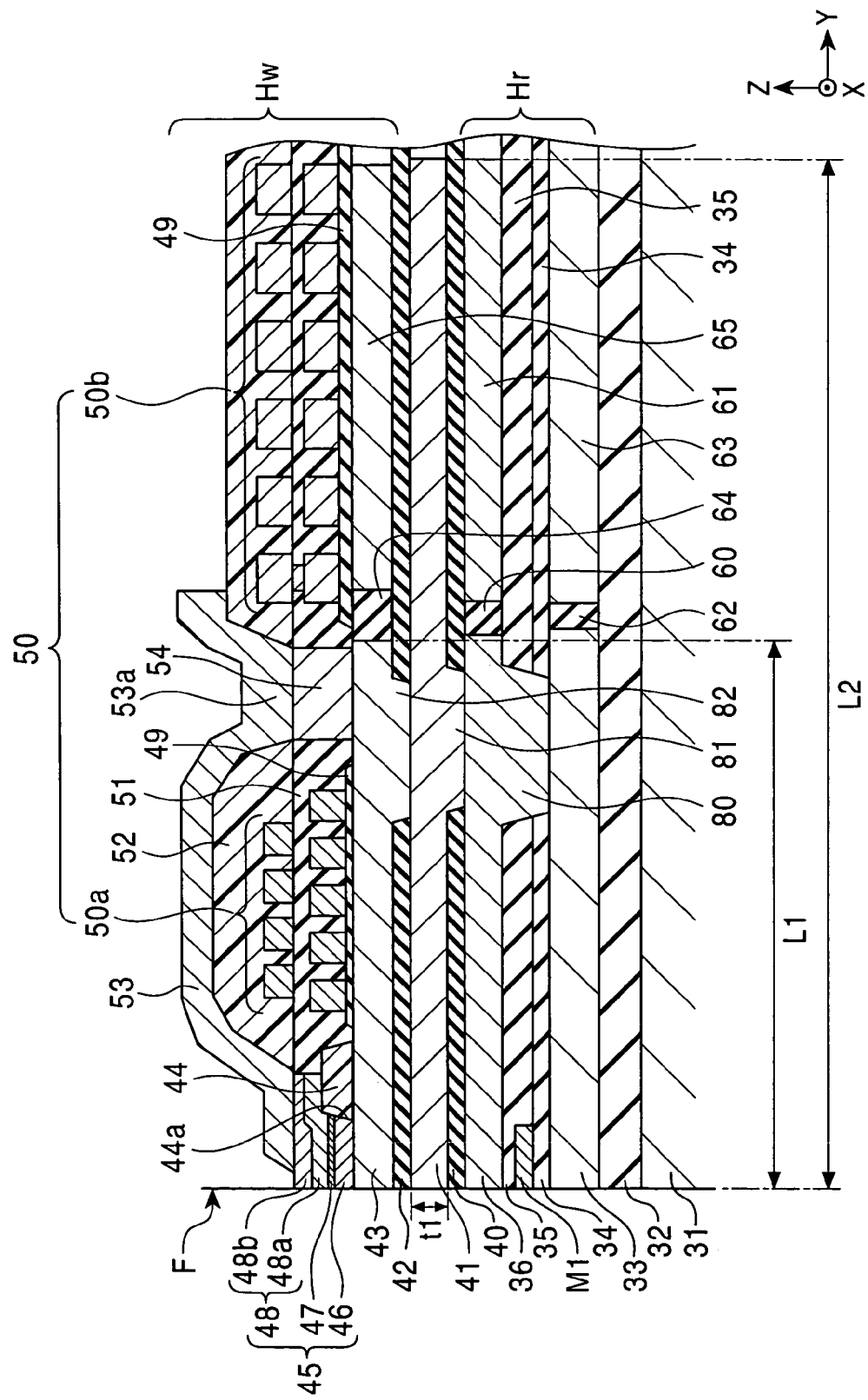
FIG. 2 is a longitudinal section taken along line II—II and viewed in the direction of the appended arrows in FIG. 1.

FIG. 1 is a front view (from a recording medium) of a magnetic head according to a first embodiment of the present invention. FIG. 2 is a longitudinal section taken along line II—II and viewed in the direction of the appended arrows in FIG. 1.

In FIGS. 1 and 2, a write head section Hw is an inductive head. This write head section Hw is formed on a read head section Hr that has, for example, a magnetoresistance effect.

This magnetic head, which is a multifunctional thin-film magnetic head including the read head section Hr and the write head section Hw, is formed on a trailing end surface 31a of a ceramic (AlTiC) slider 31 that constitutes a part of a floating magnetic head device.

The read head section Hr is disposed on an $Al_2O_3$ film 32 formed on the trailing end surface 31a of the slider 31. This read head section Hr detects a magnetic field leaking from a recording medium, such as a hard disc, using the magnetoresistance effect to read a recording signal.

The read head section Hr includes a lower shield layer 33, a lower gap layer 34, a magnetic field reader M1, an upper gap layer 35, and an upper shield layer 36. The magnetic field reader M1 is, for example, a magnetoresistive element exemplified by a giant magnetoresistive (GMR) element (typically, a spin valve film), which has a giant magnetoresistance effect; a tunneling magnetoresistive (TMR) element, which has a tunneling magnetoresistance effect; and an anisotropic magnetoresistive (AMR) element, which has an anisotropic magnetoresistance effect.

The width of the magnetic field reader M1 in the track-width direction (the X direction in the drawings) is the track width of the read head section Hr.

The lower and upper gap layers 34 and 35 are composed of an insulating material such as $Al_2O_3$ and $SiO_2$ while the lower and upper shield layers 33 and 36 are composed of a soft magnetic material with high permeability, such as a Ni—Fe alloy (permalloy).

A metallic material layer 41 is provided on an insulating layer 40 formed on the upper shield layer 36, and the write head section Hw is provided on another insulating layer 42 formed on the metallic material layer 41. The insulating layers 40 and 42 are composed of an insulating material such as $Al_2O_3$ and $SiO_2$. The metallic material layer 41, which is a feature of the present invention, will be described later in detail.

A lower core layer (first magnetic layer) 43 is formed on the insulating layer 42, and a gap-depth-defining layer 44 is formed on the lower core layer 43. The length between the front surface F of the magnetic head facing the recording medium and the front end surface 44a of the gap-depth-defining layer 44 is defined as a gap depth.

A magnetic pole part 45 extends from the front surface F of the magnetic head onto the gap-depth-defining layer 44.

This magnetic pole part 45 includes a lower magnetic pole layer 46, a nonmagnetic gap layer 47 formed on the lower magnetic pole layer 46, and an upper magnetic pole layer 48 formed on the gap layer 47.

The upper and lower magnetic pole layers 48 and 46 are composed of a soft magnetic material such as a Ni—Fe alloy. The gap layer 47 is composed of one or more nonmagnetic metallic materials selected from the group consisting of NiP, Ni—Pd alloys, Ni—Pt alloys, Ni—Rh alloys, Ni—W alloys, Ni—Mo alloys, Au, Pt, Rh, Pd, Ru, Cr, Ag, Cu, and Ti; or a nonmagnetic insulating material such as $Al_2O_3$ and $SiO_2$.

In this embodiment, the upper magnetic pole layer 48 is a composite of magnetic layers 48a and 48b and, as shown in FIG. 2, the magnetic layer 48a extends over the gap layer 47 and the gap-depth-defining layer 44.

The soft magnetic material for the magnetic layer 48b may be the same as or different from that for the magnetic layer 48a.

The soft magnetic material for the magnetic layer 48a preferably has a higher saturation flux density than that for the magnetic layer 48b.

If therefore the magnetic layer 48a, which is closer to the gap layer 47, is composed of a magnetic material having a higher saturation flux density, flux from an upper core layer 53 can be readily concentrated into the gap to increase recording density.

The magnetic pole part 45 may be composed of only the gap layer 47 and the upper magnetic pole layer 48.

An insulating layer 49 is formed on the lower core layer 43 on the rear side of the gap-depth-defining layer 44 in the height direction (the Y direction in the drawing). A coil layer 50 that is composed of a conductive material such as Cu and has a spiral pattern is formed on the insulating layer 49. The coil layer 50, which has a double-layer structure, is covered with an inorganic insulating layer 51 and an organic coil-insulating layer 52.

The upper core layer (second magnetic layer) 53 is formed in a pattern by, for example, frame plating and extends over the magnetic pole part 45 and the coil-insulating layer 52. A base end 53a of the upper core layer 53 is connected to a magnetic connecting layer (back gap layer) 54 formed on the lower core layer 43. The upper and lower core layers 53 and 43 are formed by plating with, for example, a Ni—Fe alloy.

A recording current applied to the coil layer 50 induces a recording magnetic field into the lower and upper core layer 43 and 53 to generate a leakage magnetic field between the lower and upper magnetic pole layers 46 and 48, which are separated by the gap layer 47. As a result, a magnetic signal is recorded from the leakage magnetic field to a recording medium such as a hard disc.

Features of the present invention will now be described.

Referring to FIG. 2, a first metal layer 61 is formed on the rear side of the upper shield layer 36 in the height direction (a first direction; the Y direction in the drawing). The upper shield layer 36 and the first metal layer 61 are separated by an insulating layer 60. The metallic material layer 41, which is disposed between the lower core layer 43 of the write head section Hw and the upper shield layer 36 of the read head section Hr, overlaps with the first metal layer 61 across the thickness (in the Z direction in the drawing).

Thus, the metallic material layer 41 can transmit joule heat generated from the coil layer 50, the upper core layer 53, and the lower core layer 43 to the first metal layer 61 to efficiently dissipate the joule heat to the outside of the magnetic head. Such efficient heat dissipation can reduce the expansion of the lower magnetic pole layer 46, the gap layer 47, the upper magnetic pole layer 48, and the upper core layer 53 to improve the recording characteristics of the magnetic head.

In the write head section Hw, the amount of heat generated is largest at the front segment 50a of the coil layer 50 between the upper and lower core layer 53 and 43. In addition, eddy current occurs to generate heat at the upper and lower core layer 53 and 43.

In the magnetic head of this embodiment, the metallic material layer 41, which is disposed between the lower core layer 43 and the upper shield layer 36, extends to the rear of the magnetic head in the height direction to overlap with the first metal layer 61 across the thickness. The metallic material layer 41 can therefore efficiently dissipate not only joule heat generated from the rear segment 50b of the coil layer 50, but also joule heat generated from the front segment 50a of the coil layer 50 and the upper and lower core layer 53 and 43 to the outside of the magnetic head through the first metal layer 61.

In the magnetic head of this embodiment, additionally, the metallic material layer 41 can block a fluctuating magnetic field generated from the write head section Hw.

Thus, this magnetic head can reduce variations in the magnetic domain structures of the upper and lower shield layers 36 and 33 to stabilize the read output of the read head section Hr.

The metallic material layer 41 is preferably composed of a nonmagnetic material. Such a metallic material layer 41 can block a fluctuating magnetic field generated from the write head section Hw more effectively. Examples of the material for the metallic material layer 41 include Ti, Au, Cu, Ni, Ag, Cr, and Pt. In addition, the thickness t1 of the metallic material layer 41 is preferably 1,000 to 10,000 Å to block a fluctuating magnetic field generated from the write head section Hw. The metallic material layer 41 may also be composed of a magnetic material in the present invention. The metallic material layer 41 preferably has a higher thermal conductivity than the upper shield layer 36, the lower shield layer 33, and the lower core layer 43.

If a nonmagnetic material is used as the material for the metallic material layer 41, the metallic material layer 41 is formed by sputtering. If, on the other hand, a magnetic material is used as the material for the metallic material layer 41, the metallic material layer 41 is formed by frame plating.

The length L2 of the metallic material layer 41 in the height direction is preferably larger than the length L1 of the lower core layer 43 in the height direction. Such a metallic material layer 41 can more efficiently transmit joule heat generated from the coil layer 50, the upper core layer 53, and the lower core layer 43 and block a fluctuating magnetic field generated from the write head section Hw.

In FIG. 1, the width W1 of the metallic material layer 41 in the track-width direction (a second direction; the X direction in the drawing) orthogonal to the height direction (the first direction; the Y direction in the drawing) is preferably larger than the width W2 of the lower core layer 43 in the track-width direction (the second direction). Such a metallic material layer 41 can more efficiently transmit joule heat generated from the coil layer 50, the upper core layer 53, and the lower core layer 43 and block a fluctuating magnetic field generated from the write head section Hw.

In FIG. 2, additionally, a second metal layer 63 is formed on the rear side of the lower shield layer 33 in the height direction (the first direction; the Y direction in the drawing). The lower shield layer 33 and the second metal layer 63 are separated by an insulating layer 62. The metallic material layer 41 overlaps with the first and second metal layers 61 and 63 across the thickness (in the Z direction in the drawing).

Thus, the metallic material layer 41 can induce joule heat generated from the coil layer 50 into the slider 31, which has high thermal conductivity, to dissipate the joule heat more efficiently.

Furthermore, a third metal layer 65 is formed on the rear side of the lower core layer 43 in the height direction (the first direction; the Y direction in the drawing). The lower core layer 43 and the third metal layer 65 are separated by an insulating layer 64. The metallic material layer 41 also overlaps with the third metal layer 65 across the thickness (in the Z direction in the drawing) to dissipate joule heat generated from the coil layer 50 more efficiently.

The material for the first metal layer 61 may be the same as or different from that for the upper shield layer 36; the material for the second metal layer 63 may be the same as or different from that for the lower shield layer 33; and the material for the third metal layer 65 may be the same as or different from that for the lower core layer 43.

If the first metal layer 61 is composed of the same material as the upper shield layer 36, the first metal layer 61 can be formed together with the upper shield layer 36. If the second metal layer 63 is composed of the same material as the lower shield layer 33, the second metal layer 63 can be formed together with the lower shield layer 33. If the third metal layer 65 is composed of the same material as the lower core layer 43, the third metal layer 65 can be formed together with the lower core layer 43.

If the first metal layer 61 is composed of a different material from the upper shield layer 36, the first metal layer 61 may be provided with a higher thermal conductivity than the upper shield layer 36. If the second metal layer 63 is composed of a different material from the lower shield layer 33, the second metal layer 63 may be provided with a higher thermal conductivity than the lower shield layer 33. If the third metal layer 65 is composed of a different material from the lower core layer 43, the third metal layer 65 may be provided with a higher thermal conductivity than the lower core layer 43.

The total volume of the first and second metal layers 61 and 63 is preferably larger than the volume of the upper shield layer 36 to dissipate joule heat generated from the write head section Hw more efficiently.

Figure 3:
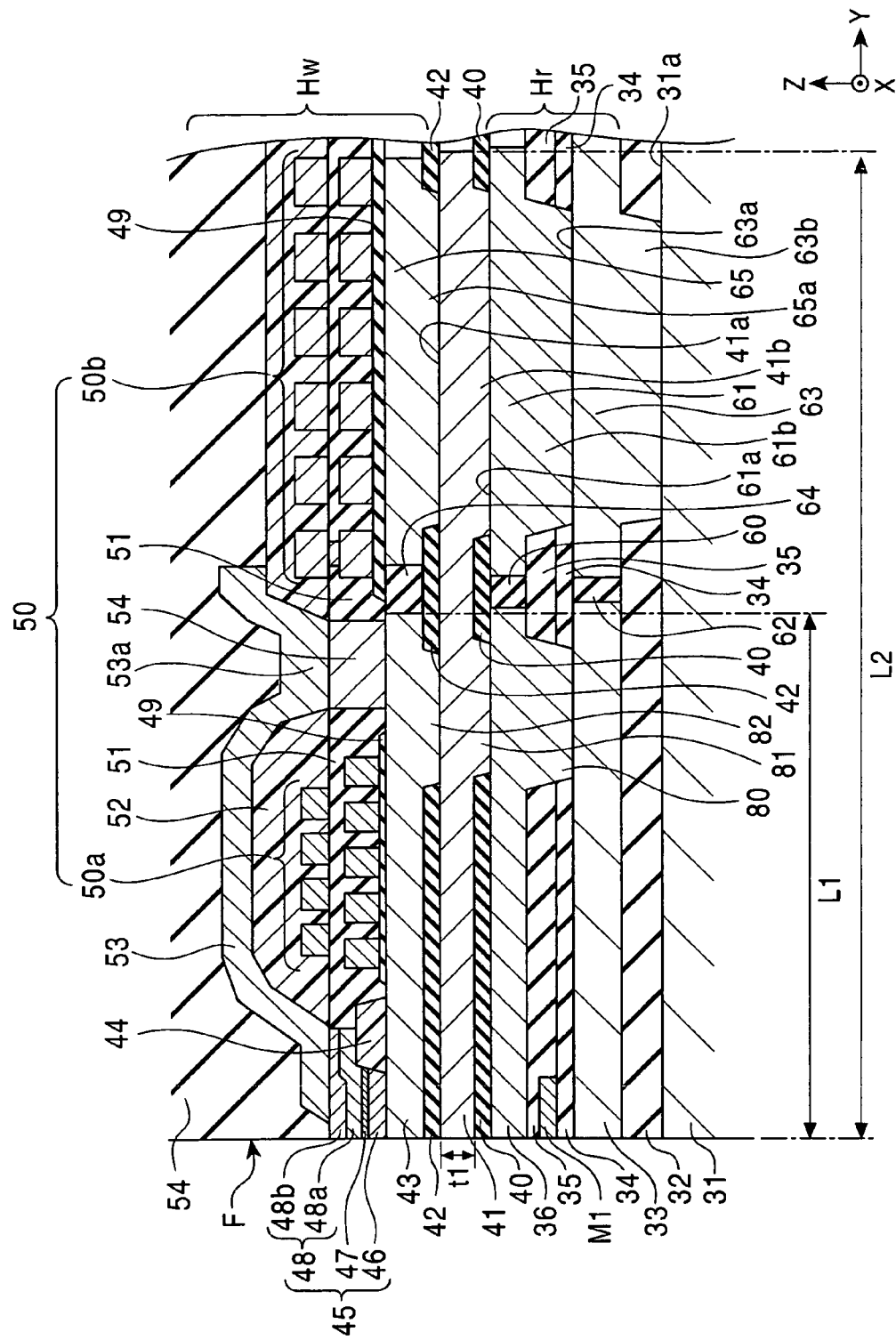
FIG. 3 is a longitudinal section of a magnetic head according to a second embodiment of the present invention.

FIG. 3 is a longitudinal section of a magnetic head according to a second embodiment of the present invention.

The magnetic head in FIG. 3 is different from that in FIGS. 1 and 2 in that the metallic material layer 41 is connected to the first and third metal layers 61 and 65, the first metal layer 61 is connected to the second metal layer 63, and the second metal layer 63 is connected to the slider (substrate) 31.

In FIG. 3, the top surface 41a of the metallic material layer 41 is connected to a connection 65a of the third metal layer 65 through an opening in the insulating layer 42. The top surface 61a of the first metal layer 61 is connected to a connection 41b of the metallic material layer 41 through an opening in the insulating layer 40.

The top surface 63a of the second metal layer 63 is connected to a connection 61b of the first metal layer 61 through an opening in the upper and lower gap layers 35 and 34. A connection 63b of the second metal layer 63 is connected to the top surface 31a of the slider 31 through an opening in the Al$_2$O$_3$ layer 32.

These connections 65a, 41b, 61b, and 63b facilitate the transmission of joule heat generated from the coil layer 50, the lower core layer 43, and the upper core layer 53 to the slider 31 to dissipate the joule heat to the outside of the magnetic head more efficiently. The joule heat from the coil layer 50 can dissipate through the slider 31 more efficiently than through a protective layer 54.

In addition, the magnetic head in FIG. 3 allows successive formation by plating of the second metal layer 63, the first metal layer 61, the metallic material layer 41, and the third metal layer 65, in that order, to eliminate the need for the step of depositing a seed layer by sputtering.

Figure 4:
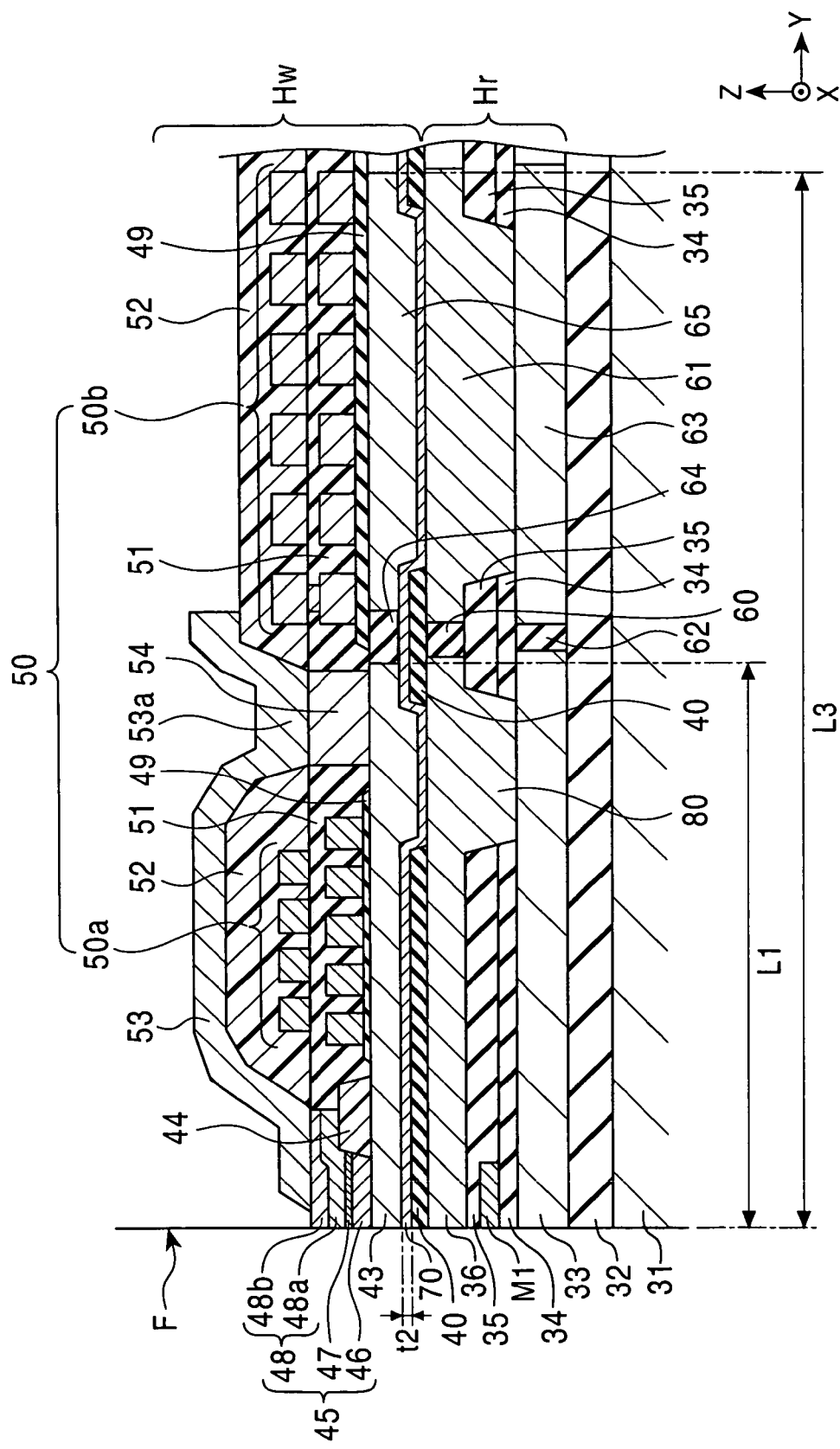
FIG. 4 is a longitudinal section of a magnetic head according to a third embodiment of the present invention.

FIG. 4 is a longitudinal section of a magnetic head according to a third embodiment of the present invention.

The magnetic head in FIG. 4 is different from that in FIGS. 1 and 2 in that a metallic material layer 70 functions as a seed layer for the lower core layer 43 and the third metal layer 65.

The metallic material layer 70 is made of a nonmagnetic metallic material by sputtering. The lower core layer 43 and the third metal layer 65 are formed by plating with the metallic material layer 70 functioning as a seed layer.

Examples of the material for the metallic material layer 70 include Ti, Au, Cu, Ni, Ag, Cr, and Pt. The thickness t2 of the metallic material layer 70 is preferably 1,000 to 10,000 Å.

Also, in the magnetic head of this embodiment, the metallic material layer 70 can transmit joule heat generated from the coil layer 50 (particularly, from its front segment 50a), the upper core layer 53, and the lower core layer 43 to the first and second metal layers 61 and 63 to efficiently dissipate the joule heat to the outside of the magnetic head. Such efficient heat dissipation can reduce the expansion of the lower magnetic pole layer 46, the gap layer 47, the upper magnetic pole layer 48, and the upper core layer 53 to improve the recording characteristics of the magnetic head.

In addition, the metallic material layer 70 can block a fluctuating magnetic field generated from the write head section Hw. This magnetic head can therefore reduce variations in the magnetic domain structures of the upper and lower shield layers 36 and 33 to stabilize the read output of the read head section Hr.

The lower core layer 43 and the third metal layer 65, which are separated by the insulating layer 64 in FIG. 4, may also be integrated.

If the lower core layer 43 and the third metal layer 65 are integrated, joule heat generated from the front segment 50a of the coil layer 50, the upper core layer 53, and the lower core layer 43 can be more efficiently transmitted to the first and second metal layers 61 and 63.

The length L3 of the metallic material layer 70 in the height direction is preferably larger than the length L1 of the lower core layer 43 in the height direction. Such a metallic material layer 70 can more efficiently transmit joule heat generated from the write head section Hw and block a fluctuating magnetic field generated from the write head section Hw.

Figure 5:
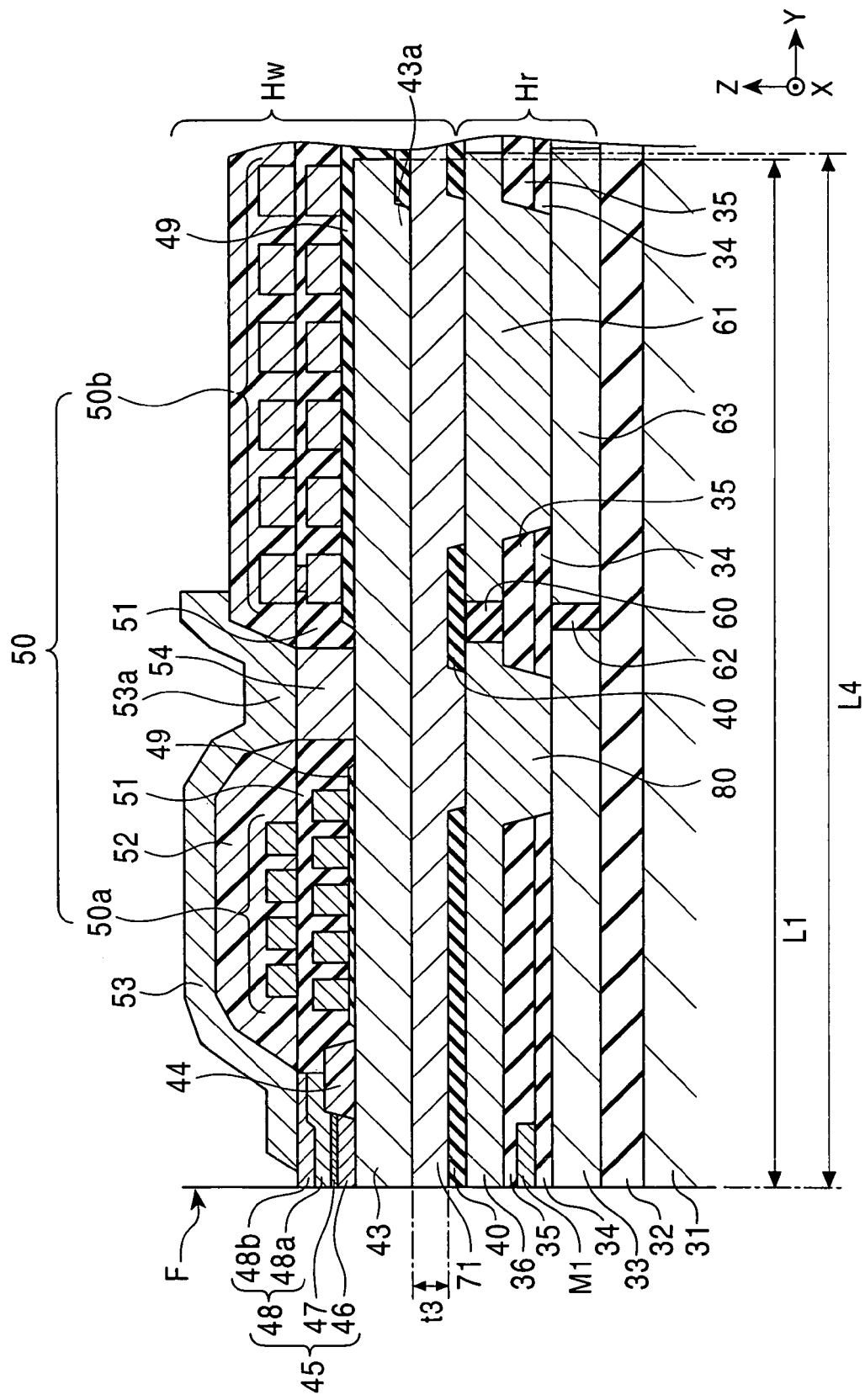
FIG. 5 is a longitudinal section of a magnetic head according to a fourth embodiment of the present invention.

FIG. 5 is a longitudinal section of a magnetic head according to a fourth embodiment of the present invention.

The magnetic head in FIG. 5 is similar to that in FIG. 4; however, the magnetic head in FIG. 5 is different from that in FIG. 4 in that a metallic material layer 71 is made of a nonmagnetic metallic material by plating.

In FIG. 5, additionally, the lower core layer 43 extends to the rear of the magnetic head in the height direction. The rear 43a of the lower core layer 43 overlaps with the rear segment 50b of the coil layer 50 across the thickness to function also as the third metal layer 65 of the present invention, where the third metal layer 65 may be further formed, which is separated from the lower core layer 43.

Examples of the material for the metallic material layer 71 include Ti, Au, Cu, Ni, Ag, Cr, and Pt. The thickness t3 of the metallic material layer 71 is preferably 1,000 to 10,000 Å. If the metallic material layer 71 is formed by plating, the thickness t3 of the metallic material layer 71 can be readily increased to sufficiently block a fluctuating magnetic field generated from the write head section Hw. This magnetic head can therefore reduce variations in the magnetic domain structures of the upper and lower shield layers 36 and 33 to stabilize the read output of the read head section Hr.

Also, in the magnetic head of this embodiment, the metallic material layer 71 can transmit joule heat generated from the coil layer 50 (particularly, from its front segment 50a), the upper core layer 53, and the lower core layer 43 to the first and second metal layers 61 and 63 to efficiently dissipate the joule heat to the outside of the magnetic head.

The length L4 of the metallic material layer 71 in the height direction is preferably larger than the length L1 of the lower core layer 43 in the height direction. Such a metallic material layer 71 can more efficiently transmit joule heat generated from the write head section Hw and block a fluctuating magnetic field generated from the write head section Hw.

Figure 6:
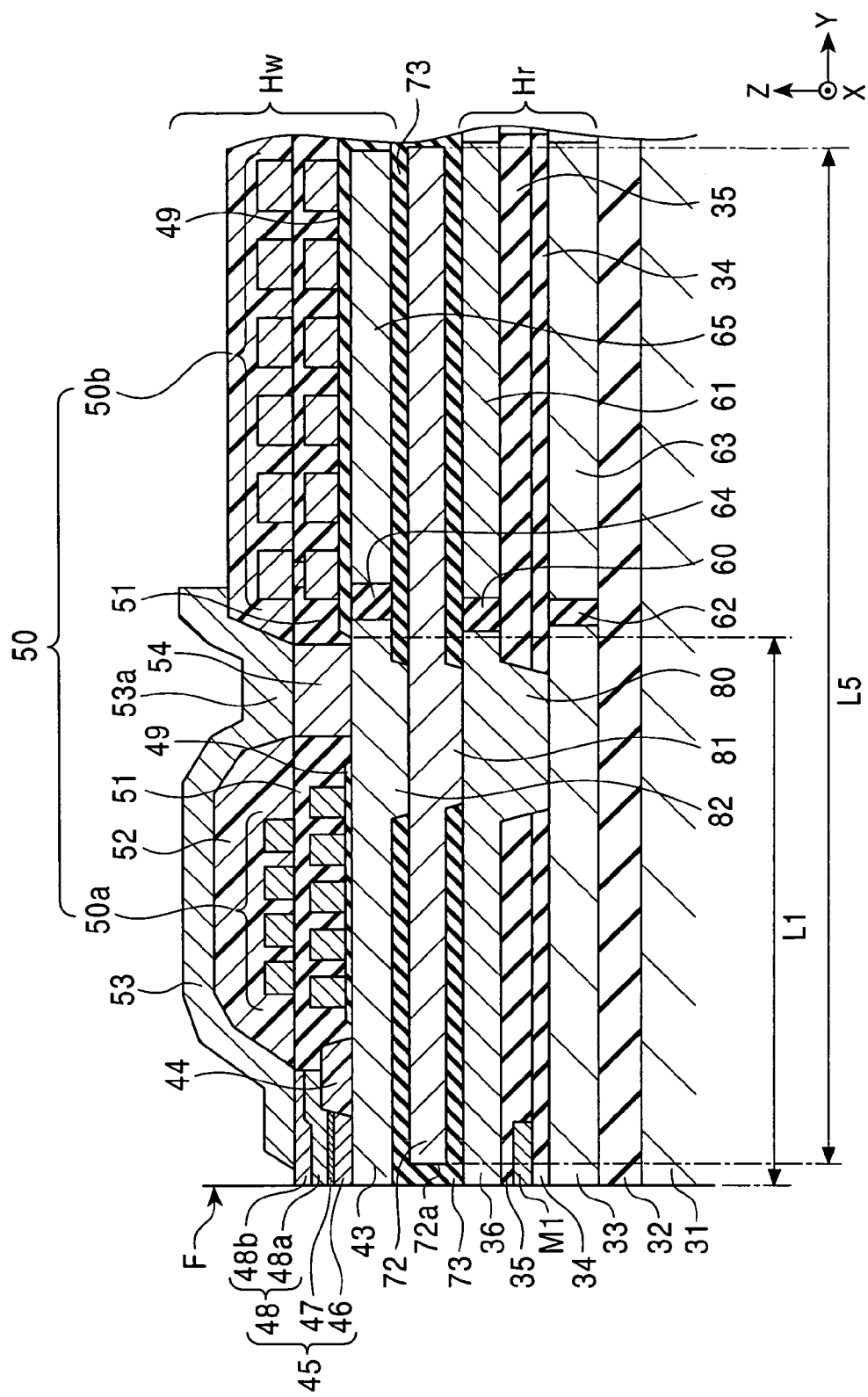
FIG. 6 is a longitudinal section of a magnetic head according to a fifth embodiment of the present invention.

FIG. 6 is a longitudinal section of a magnetic head according to a fifth embodiment of the present invention.

The magnetic head in FIG. 6 is similar to that in FIGS. 1 and 2; however, the magnetic head in FIG. 6 is different from that in FIGS. 1 and 2 in that the front end surface 72a of a metallic material layer 72 is positioned in the rear side of the front surface F of the magnetic head facing a recording medium in the height direction (the first direction; the Y direction in the drawing). The thickness and material of the metallic material layer 72 are the same as those of the metallic material layer 41 in FIGS. 1 and 2.

The front end surface 72a of the metallic material layer 72 is preferably positioned in the rear side of the front surface F of the magnetic head in the height direction because a smaller amount of frictional heat generated when the magnetic head slides over a recording medium propagates into the magnetic head.

The length L5 of the metallic material layer 72 in the height direction is preferably larger than the length L1 of the lower core layer 43 in the height direction. Such a metallic material layer 72 can more efficiently transmit joule heat generated from the write head section Hw and block a fluctuating magnetic field generated from the write head section Hw.

Referring back to FIGS. 2 and 3, the upper and lower shield layers 36 and 33 are connected through a metallic connection 80, the upper shield layer 36 and the metallic material layer 41 are connected through a metallic connection 81, and the lower core layer 43 and the metallic material layer 41 are connected through a metallic connection 82. These connections 80, 81, and 82 can keep the lower shield layer 33, the upper shield layer 36, the metallic material layer 41, and the lower core layer 43 at the same potential. This reduces the corrosion of the lower shield layer 33, the upper shield layer 36, the metallic material layer 41, and the lower core layer 43 at the front surface F of each magnetic head.

When the lower shield layer 33, the upper shield layer 36, the metallic material layer 41, and the lower core layer 43 are connected, joule heat generated from the write head section Hw readily propagates into the read head section Hr. According to the present invention, however, the metallic material layer 41 extends to the rear of each magnetic head in the height direction to overlap with the first metal layer 61, thus dissipating the joule heat to the outside of the magnetic head through the first metal layer 61. In addition, the metallic material layer 41 can block a fluctuating magnetic field generated from the write head section Hw.

Accordingly, compared with known magnetic heads that do not include the metallic material layer 41, the magnetic heads in FIGS. 2 and 3 can reduce variations in the magnetic domain structures of the upper and lower shield layers 36 and 33 to stabilize the read output of the read head section Hr.

In FIG. 4, similarly, the lower shield layer 33, the upper shield layer 36, the metallic material layer 70, and the lower core layer 43 are connected and, in FIG. 5, the lower shield layer 33, the upper shield layer 36, the metallic material layer 71, and the lower core layer 43 are connected. Compared with known magnetic heads that do not include the metallic material layer 70 or 71, the magnetic heads in FIGS. 4 and 5 can reduce variations in the magnetic domain structures of the upper and lower shield layers 36 and 33 to stabilize the read output of the read head section Hr.

The metallic material layer 41, 70, or 71, however, is preferably separated from the upper shield layer 36 and/or the lower shield layer 33 in view of suppressing the propagation of joule heat generated from the write head section Hw into the upper and lower shield layer 36 and 33 to reduce variations in the magnetic domain structures of the upper and lower shield layers 36 and 33.

Figure 7:
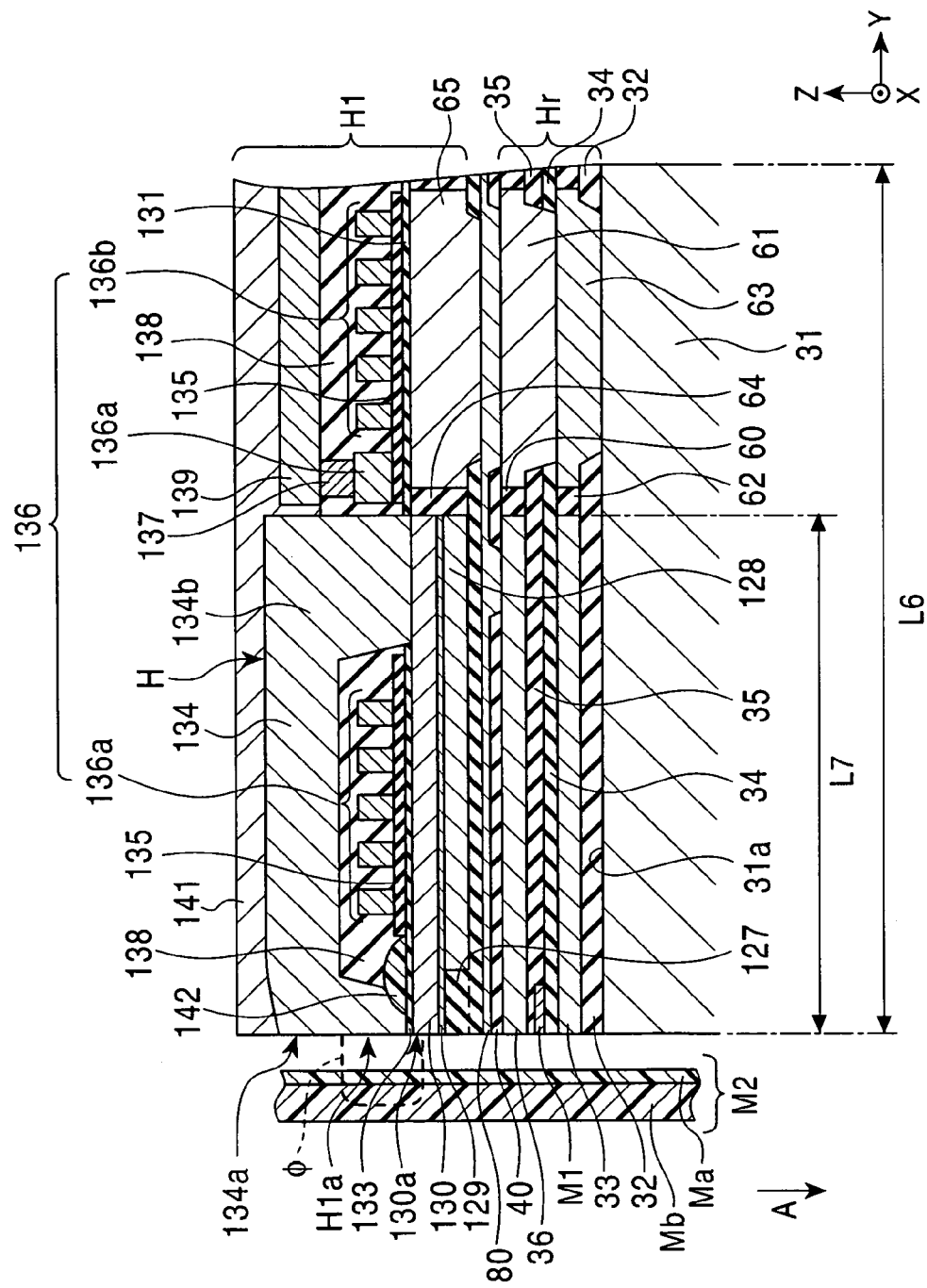
FIG. 7 is a longitudinal section of a magnetic head according to a sixth embodiment of the present invention.
Figure 8:
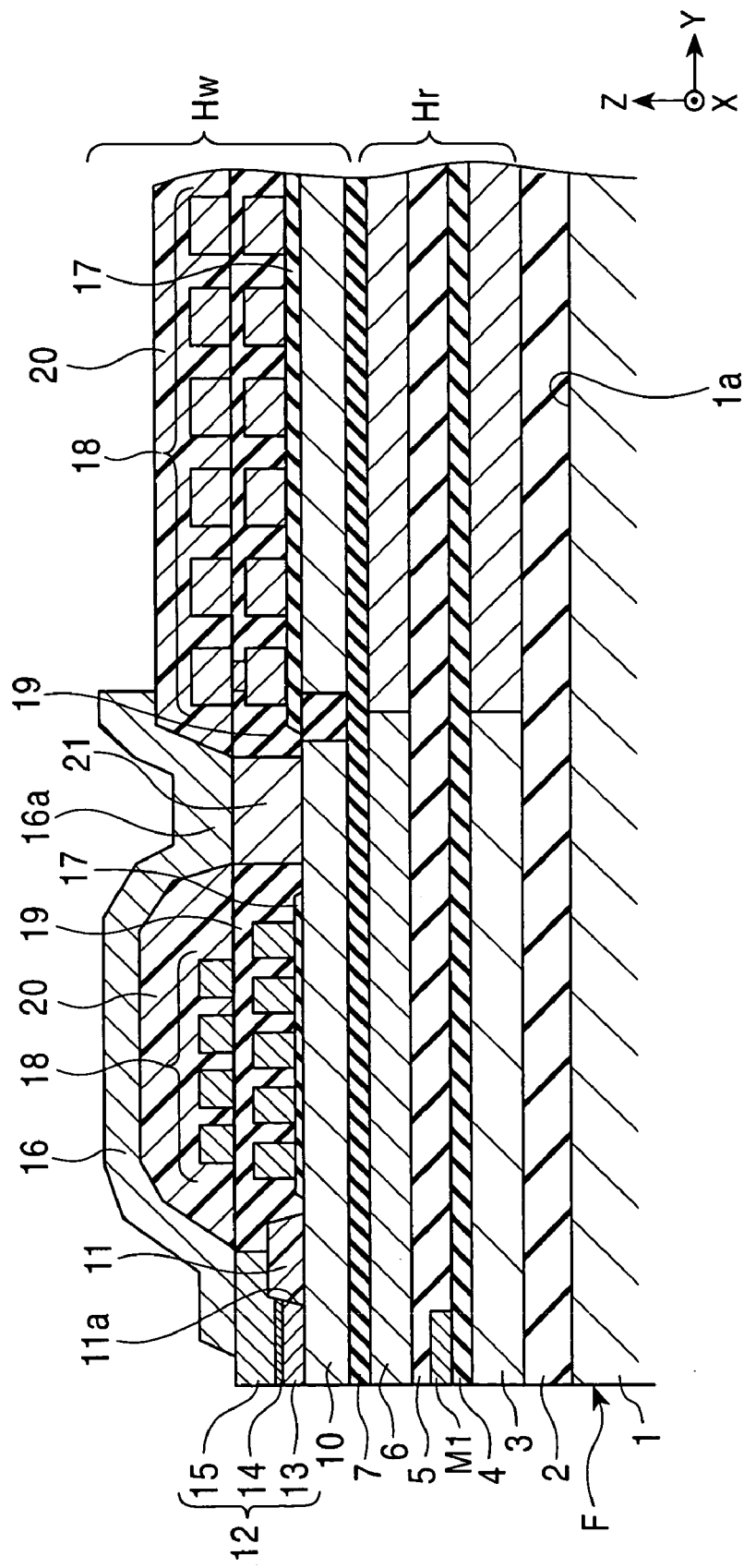
FIG. 8 is a longitudinal section of a known magnetic head.

FIG. 7 is a longitudinal section of a magnetic head according to a sixth embodiment of the present invention.

In FIG. 7, a write head section H1 that employs perpendicular magnetic recording is provided on the read head section Hr, which is the same as those in FIGS. 1 to 6 and has the magnetoresistance effect.

A perpendicular magnetic recording head H in FIG. 7 applies a perpendicular magnetic field onto a recording medium M2 that is a rotatable disc including an outer hard part Ma with high residual magnetization and an inner soft part Mb with high magnetic permeability to magnetize the hard part Ma perpendicularly. In FIG. 7, the recording medium M2 shifts in the Z direction with respect to the slider 31. The perpendicular magnetic recording head H is provided on the trailing side of the slider 31.

In the magnetic head in FIG. 7, a main magnetic pole layer (first magnetic layer) 130 for generating a recording magnetic field is positioned below an auxiliary magnetic pole layer (second magnetic layer) 134.

In FIG. 7, the write head section H1 includes a yoke layer 128 made of a ferromagnetic material such as permalloy (Ni—Fe) by plating. This yoke layer 128 is embedded in a separating layer 127 and is not exposed at the front surface F of the magnetic head facing the recording medium M2.

A seed film 129 of a conductive metal such as a Ni—Fe alloy is formed on the top surface of the yoke layer 128 by sputtering.

The main magnetic pole layer 130 is formed on the seed film 129 by plating. This main magnetic pole layer 130 is composed of a ferromagnetic material with high saturation flux density, such as a Ni—Fe alloy, a Co—Fe alloy, and a Ni—Fe—Co alloy. The magnetic material for the main magnetic pole layer 130 preferably has a higher saturation flux density Bs than that for the yoke layer 128. The width of the yoke layer 128 in the track-width direction is larger than the width Wt of the main magnetic pole layer 130 in the track-width direction, though they are not shown in the drawing.

An insulating layer 133 of an inorganic material such as alumina and $SiO_2$ is formed on the main magnetic pole layer 130. The auxiliary magnetic pole layer 134, which is composed of a ferromagnetic material such as permalloy, is formed on the insulating layer 133.

The front end surface 134a of the auxiliary magnetic pole layer 134 is exposed at the front surface F of the magnetic head. A connection 134b of the auxiliary magnetic pole layer 134 is connected to the main magnetic pole layer 130 and the yoke layer 128 on the rear side of the front surface F of the magnetic head to form a magnetic path across the auxiliary magnetic pole layer 134, the main magnetic pole layer 130, and the yoke layer 128.

A coil-insulating base layer 135 is formed around the connection 134b. A coil layer 136 is formed on this coil-insulating base layer 135. This coil layer 136 is made of a conductive material such as Cu by, for example, frame plating and has a spiral pattern with a predetermined number of turns around the connection 134b. An extension layer 137 of a conductive material such as Cu is formed on a connection end 136a in the center of the coil layer 136.

The coil layer 136 and the extension layer 137 are coated with a coil-insulating layer 138 of an organic material such as a resist material. This coil-insulating layer 138 may be further coated with an inorganic insulating layer of, for example, $Al_2O_3$, which is not shown in the drawing.

The top surface of the extension layer 137 is exposed at the top surface of the coil-insulating layer 138 and is connected to a lead layer 139 for supplying a recording current for the coil layer 136 through the extension layer 137.

The auxiliary magnetic pole layer 134 and the lead layer 139 are coated with a protective layer 141 of, for example, an inorganic nonmagnetic insulating material.

An organic or inorganic gap-depth-defining layer 142 is formed on the insulating layer 133 at a predetermined distance from the front surface F of the magnetic head. The length between the front surface F of the magnetic head and the front end of the gap-depth-defining layer 142 is defined as the gap depth of the write head section H1.

In the write head section H1 in FIG. 7, a recording current applied on the coil layer 136 through the lead layer 139 induces a recording magnetic field into the auxiliary magnetic pole layer 134 and the yoke layer 128. This recording magnetic field leaks from the front end surface 130a of the main magnetic pole layer 130 and the front end surface 134a of the auxiliary magnetic pole layer 134 to penetrate through the hard part Ma and soft part Mb of the recording medium M2.

At the front surface F of the magnetic head, the area of the front end surface 130a of the main magnetic pole layer 130 is sufficiently smaller than that of the front end surface 134a of the auxiliary magnetic pole layer 134. Thus, the flux ø of the leakage recording magnetic field is concentrated on the front end surface 130a of the main magnetic pole layer 130. The concentrated flux ø magnetizes the hard part Ma perpendicularly to record magnetic data.

Features of the magnetic head of this embodiment will now be described.

Referring to FIG. 7, the first metal layer 61 is formed on the rear side of the upper shield layer 36 in the height direction (the first direction; the Y direction in the drawing). The upper shield layer 36 and the first metal layer 61 are separated by the insulating layer 60. A metallic material layer 80 is provided between the main magnetic pole layer 130 of the write head section H1 and the upper shield layer 36 of the read head section Hr and overlaps with the first metal layer 61 across the thickness (in the Z direction in the drawing).

In addition, the second metal layer 63 is formed on the rear side of the lower shield layer 33 in the height direction (the first direction; the Y direction in the drawing). The lower shield layer 33 and the second metal layer 63 are separated by the insulating layer 62. The metallic material layer 80 overlaps with the first and second metal layers 61 and 63 across the thickness (in the Z direction in the drawing).

Furthermore, the third metal layer 65 is formed on the rear side of the main magnetic pole layer 130 and the yoke layer 128 in the height direction (the first direction; the Y direction in the drawing). The third metal layer 65 is separated from the main magnetic pole layer 130 and the yoke layer 128 by the insulating layer 64. The metallic material layer 80 also overlaps with the third metal layer 65 across the thickness (in the Z direction in the drawing) to dissipate joule heat generated from the coil layer 136 more efficiently.

In the write head section H1, the amount of heat generated is largest at the front segment 136a of the coil layer 136 between the auxiliary magnetic pole layer 134 and the main magnetic pole layer 130 and the yoke layer 128. In addition, eddy current occurs to generate heat at the auxiliary magnetic pole layer 134, the main magnetic pole layer 130, and the yoke layer 128.

In the magnetic head of this embodiment, the metallic material layer 80, which is disposed between the main magnetic pole layer 130 and the yoke layer 128 and the upper shield layer 36, extends to the rear of the magnetic head in the height direction to overlap with the first metal layer 61. The metallic material layer 80 can therefore efficiently dissipate not only joule heat generated from the rear segment 136b of the coil layer 136, but also joule heat generated from the front segment 136a of the coil layer 136, the auxiliary magnetic pole layer 134, the main magnetic pole layer 130, and the yoke layer 128 to the outside of the magnetic head through the first metal layer 61. Such efficient heat dissipation can reduce the expansion of the main magnetic pole layer 130 to improve the recording characteristics of the magnetic head.

In the magnetic head of this embodiment, additionally, the metallic material layer 80 can block a fluctuating magnetic field generated from the write head section H1.

Thus, this magnetic head can reduce variations in the magnetic domain structures of the upper and lower shield layers 36 and 33 to stabilize the read output of the read head section Hr.

The metallic material layer 80 is preferably composed of a nonmagnetic material. Such a metallic material layer 80 can block a fluctuating magnetic field generated from the write head section H1 more effectively. Examples of the material for the metallic material layer 80 include Ti, Au, Cu, Ni, Ag, Cr, and Pt. In addition, the thickness t1 of the metallic material layer 80 is preferably 1,000 to 10,000 Å to block a fluctuating magnetic field generated from the write head section H1. The metallic material layer 80 may also be composed of a magnetic material in the present invention. The metallic material layer 80 preferably has a higher thermal conductivity than the upper shield layer 36, the lower shield layer 33, the main magnetic pole layer 130, and the yoke layer 128.

If a nonmagnetic material is used as the material for the metallic material layer 80, the metallic material layer 80 is formed by sputtering. If a magnetic material is used as the material for the metallic material layer 80, the metallic material layer 80 is formed by frame plating.

The length L6 of the metallic material layer 80 in the height direction is preferably larger than the length L7 of the main magnetic pole layer 130 and the yoke layer 128 in the height direction. Such a metallic material layer 80 can more efficiently transmit joule heat generated from the coil layer 136, the auxiliary magnetic pole layer 134, the main magnetic pole layer 130, and the yoke layer 128 and block a fluctuating magnetic field generated from the write head section H1.

The width of the metallic material layer 80 in the track-width direction (the second direction; the X direction in the drawing) orthogonal to the height direction (the first direction; the Y direction in the drawing) is preferably larger than the width of the main magnetic pole layer 130 and the yoke layer 128 in the track-width direction (the second direction). Such a metallic material layer 80 can more efficiently transmit joule heat generated from the coil layer 136, the auxiliary magnetic pole layer 134, the main magnetic pole layer 130, and the yoke layer 128 and block a fluctuating magnetic field generated from the write head section H1.

In FIG. 7, additionally, the top surface of the metallic material layer 80 is connected to the third metal layer 65 through an opening in the separating layer 127. The top surface of the first metal layer 61 is connected to the metallic material layer 80 through an opening in the insulating layer 40.

The top surface of the second metal layer 63 is connected to the first metal layer 61 through an opening in the upper and lower gap layers 35 and 34. The second metal layer 63 is connected to the top surface 31a of the slider 31 through an opening in the $Al_2O_3$ layer 32.

These connections facilitate the transmission of joule heat generated from the coil layer 136, the main magnetic pole layer 130, the yoke layer 128, and the auxiliary magnetic pole layer 134 to the slider 31 to dissipate the joule heat to the outside of the magnetic head more efficiently. The joule heat can dissipate through the slider 31 more efficiently than through the protective layer 141.

The above magnetic head of the sixth embodiment may be modified as in the first to fifth embodiments.

The main magnetic pole layer 130, which generates a recording magnetic field, may be disposed above the auxiliary magnetic pole layer 134. In this case, the auxiliary magnetic pole layer 134 functions as the first magnetic layer of the present invention and the main magnetic pole layer 130 functions as the second magnetic layer of the present invention.

The above preferred embodiments may be modified in various ways within the scope of the present invention.

The above embodiments are only examples of the present invention; they do not limit the scope of the present invention.

What is claimed is:

1. A magnetic head comprising:
   a write head section comprising a first magnetic layer, a second magnetic layer disposed above the first magnetic layer, and a coil layer for applying a magnetic field onto the first and second magnetic layers;
   a read head section comprising an upper shield layer, a lower shield layer, a reader disposed between the upper shield layer and the lower shield layer, and a first metal layer disposed at a rear side of the upper shield layer relative to a media facing surface of the magnetic head, the first metal layer being separated from the upper shield layer; and
   a metallic material layer disposed between the write head section and the read head section, overlapping with the first metal layer.

2. The magnetic head according to claim 1, further comprising a second metal layer disposed at a rear side of the lower shield layer relative to the media facing surface of the magnetic head, the second metal layer being separated from the lower shield layer, the metallic material layer overlapping with the second metal layer.

3. The magnetic head according to claim 2, wherein the first metal layer is connected to the metallic material layer; and the second metal layer is connected to the first metal layer.

4. The magnetic head according to claim 2, wherein the read head section is disposed on a substrate; and the second metal layer is connected to the substrate.

5. The magnetic head according to claim 1, further comprising a third metal layer disposed at a rear side of the first magnetic layer relative to the media facing surface of the magnetic head, the third metal layer being integrated with or separated from the first magnetic layer, the metallic material layer overlapping with the third metal layer.

6. The magnetic head according to claim 5, wherein the third metal layer is connected to the metallic material layer.

7. The magnetic head according to claim 1, wherein the metallic material layer is connected to the first magnetic layer.

8. The magnetic head according to claim 1, wherein the metallic material layer is composed of a nonmagnetic material.

9. The magnetic head according to claim 8, wherein a thickness of the metallic material layer is 1,000 to 10,000 Å.

10. The magnetic head according to claim 1, wherein a front end surface of the metallic material layer is positioned at a rear side of the media facing surface of the magnetic head.

11. The magnetic head according to claim 1, wherein a length of the metallic material layer in a direction perpendicular to the media facing surface of the magnetic head is larger than a length of the first magnetic layer in the direction perpendicular to the media facing surface of the magnetic head.

12. The magnetic head according to claim 1, wherein a width of the metallic material layer in a direction parallel to the media facing surface of the magnetic head is larger than a width of the first magnetic layer in the direction parallel to the media facing surface of the magnetic head.

* * * * *